United States Patent [19]
Harklau

[11] 3,762,817
[45] Oct. 2, 1973

[54] SPECTRAL DENSITOMETER

[75] Inventor: Lanny L. Harklau, Minneapolis, Minn.

[73] Assignee: Minnesota Mining and Manufacturing Co., St. Paul, Minn.

[22] Filed: Feb. 23, 1972

[21] Appl. No.: 228,641

[52] U.S. Cl............ 356/73, 250/226, 356/179, 356/189, 356/201, 356/205, 356/209, 356/212
[51] Int. Cl.................... G01n 21/00, G01j 3/48
[58] Field of Search............ 356/73, 179, 184, 356/186, 189, 201, 202, 203, 204, 205, 209, 356/210, 211, 212; 350/87, 91; 250/226

[56] References Cited
UNITED STATES PATENTS

| | | | |
|---|---|---|---|
| 3,687,519 | 8/1972 | Mapes | 356/201 |
| 2,144,653 | 1/1939 | Graff | 350/91 |
| 198,782 | 1/1878 | Tolles | 350/87 |
| 3,205,770 | 9/1965 | Koch et al. | 350/87 |
| 3,392,623 | 7/1968 | Walker et al. | 356/205 |
| 3,076,375 | 2/1963 | Donnell | 356/210 |
| 2,287,322 | 6/1942 | Nelson | 356/211 |
| 2,380,244 | 7/1945 | Jones et al. | 356/202 |
| 2,775,160 | 12/1956 | Foskett et al. | 356/188 |
| 3,653,763 | 4/1972 | Davies | 356/186 |

OTHER PUBLICATIONS

Absolute Sensitometric Measurements ....; Wiebe et al.; Photographic Science & Engineering; Vol. 8, No. 5, Sept. -Oct. 64, pg. 293-295.

Primary Examiner—Ronald L. Wibert
Assistant Examiner—V. P. McGraw
Attorney—Kinney, Alexander, Sell, Steldt & Delahunt

[57] ABSTRACT

Absolute optical density measurements in the reflection mode as well as the transmission mode are possible with the single beam spectral densitometer. The light source is movable at a fixed radius about a point located centrally of an aperture provided in a support on which a specimen to be investigated is placed, making it possible to use the same light source for the transmission and reflection mode. With the light source as described, the calibration obtained with the light source positioned for the transmission mode is valid for the reflection mode. Provision is made to correct for any changes in the photomultiplier tube and the light source of the densitometer by measuring the output of the photomultiplier when applying the light source to the photomultiplier tube via fiber optics and several different interference filters. A light emitting diode provides a source of light which before each output measurement is directed to the photomultiplier tube to minimize hysteresis and space charge effects. A series of interference filters covering the optical spectrum are used when making density measurements. These are mounted on a first filter wheel. Separate neutral density filters which are mounted on a second filter wheel are used for calibration.

14 Claims, 3 Drawing Figures

PATENTED OCT 2 1973 3,762,817

“3,762,817”

SPECTRAL DENSITOMETER

BACKGROUND OF THE INVENTION

1. Field of the Invention

The invention presented herein relates to spectral densitometers and more particularly to single beam type spectral densitometers and the method of calibration thereof.

2. Description of the Prior Art

The densitometers are used for measuring the optical reflection or transmission density of a specimen or sample such as plastics, film, paper, painted or treated surfaces and the like. Prior art densitometers include those designed to operate using the dual beam principle and those utilizing the single beam principle. Densitometers using the dual beam principle can only be used to measure relative optical reflection density and relative transmission density. While there are densitometers using the single beam principle that can be used to measure absolute transmission density, none is known capable of being used to make absolute transmission density measurements and absolute reflection density measurements.

Prior art densitometers when used to make reflection density measurements required the use of a reference material such as magnesium oxide, barium sulfate or the like to represent an ideal reflector. This being the case, measurements obtained for a specimen or sample using one densitometer with its reference material cannot be repeated by a second densitometer since the second densitometer is operated using a different reference. In addition, it is possible for the reference material used to change slightly over a period of time so that measurements made at one time will not correspond to measurements made on the same material at another time.

SUMMARY OF THE INVENTION

The invention presented herein provides a spectral densitometer capable of being used to make absolute density measurements in the reflection mode as well as the transmission mode. Like prior art single beam densitometers, a specimen or sample support is provided. A single light source is used which unlike any known densitometers, is mounted for movement at a fixed radius about a point located centrally of the aperture in the specimen support. The light source is movable to a first position on one side of the specimen support in line with the aperture and a phototube or photomultiplier tube positioned on the other side of the specimen support. Absolute transmission density measurements are made and the densitometer calibrated with the light source so positioned. Absolute reflection density measurements are made when the light source is moved to a second position on the phototube side of the support.

In a preferred embodiment, the specimen support presents a flat surface so the point which the light is rotated also lies in the plane defined by the flat surface of the specimen support. A first filter wheel positioned between the specimen and the phototube carries a first series of calibrated interference filters. One of the series of interference filters is used during calibration with each filter of the series used separately to determine the optical density of a sample.

Rather than using a variable grey plate or absorption wedge for use in calibrating the densitometer, a series of calibrated neutral density filters are mounted on a second rotatable filter wheel positioned adjacent to the first filter wheel.

A second series of interference filters is used in connection with a light piping arrangement which extends from the light source to the phototube in order that spectral corrections can be made for changes that may take place at the light source or at the phototube following calibration of the densitometer. In the preferred embodiment, the second series of interference filters is mounted on the first filter wheel inwardly of the first series of interference filters.

The use of filter wheels presents a structure that can be adapted for controlled and automatic positioning of the various filters during calibration and during density measurements.

BRIEF DESCRIPTION OF THE DRAWING

The invention will best be understood by reference to the following specification taken in conjunction with the accompanying drawings in which.

DESCRIPTION OF THE PREFERRED EMBODIMENT

Figure 1:
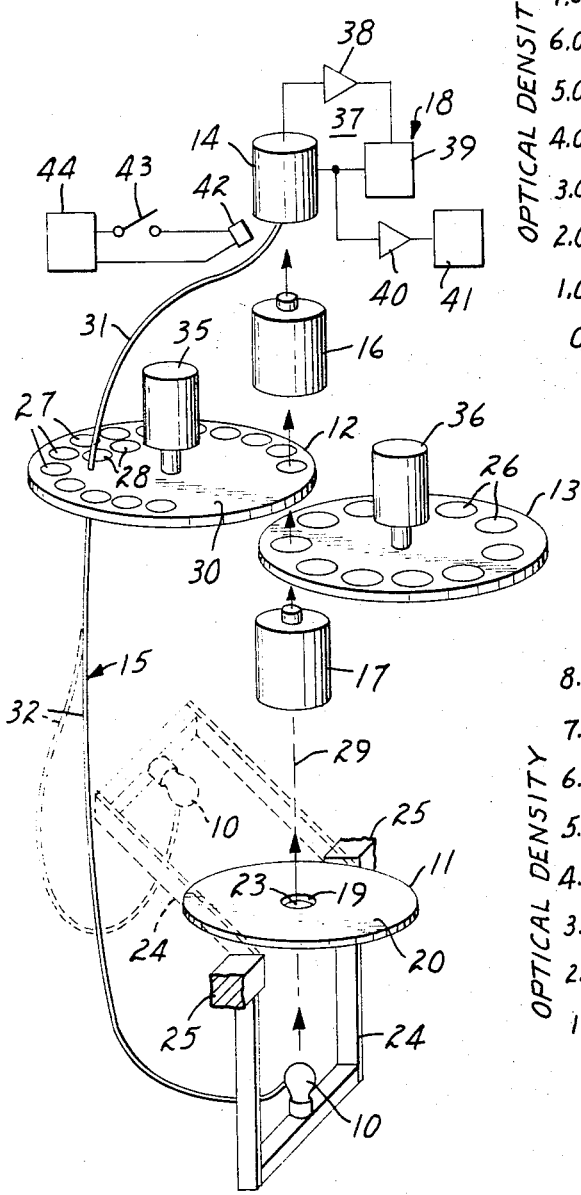
FIG. 1 is a schematic representation of the spectral densitometer.

Referring now to FIG. 1, a single beam densitometer is shown in schematic form which includes a single light source 10, a specimen or sample support 11, two rotatable filter wheels 12 and 13, a phototube or photomultiplier tube 14, a light piping arrangement 15, two light baffles 16 and 17 and circuitry 18 which connects with the phototube for measuring the output of the phototube 14 in response to light received at the phototube 14.

The sample or specimen support 11 has an aperture 19 and presents a surface at 20 upon which a sample or specimen to be examined can be positioned. In the preferred embodiment, the surface at 20 is flat.

It is necessary that the light directed to the sample or specimen be collimated. Therefore, while the light source 10 is schematically represented by an incandescent lamp, it should be understood that such representation includes known structure for collimating the light. The term light source as used herein therefore means collimated light source.

The light source 10 is mounted for rotation at a fixed radius about a point 23 located centrally of the aperture 19. In the preferred embodiment, the point 23 is also in the plane defined by the flat surface 20 of support 11. The light source 10 may be in the form of an incandescent lamp which is mounted on a lamp support 24. The support 24 is rotatably secured to the frame or support means 25 for movement about an axis of rotation which passes through the point 23 and lies in the plane defined by the flat surface 20 of specimen or sample support 11.

FIG. 1 of the drawing shows the light source 10 in two positions. A first position at which the light source 10 is placed is shown by the solid lines defining the light source 10 and the lamp support 24. This position is used when the densitometer is to be operated for making density measurements in the transmission mode and is the position used when calibrating the densitometer.

A second position for light source 10 is shown by the dotted lines defining the light source 10 and lamp support 24. The second position is used when the densitometer is to be operated for making density measurements in the reflection mode.

The photomultiplier tube 14 is positioned on the surface 20 side of the specimen or sample support 11 in line with the aperture 19 in support 11 and light source 10 when in its transmission mode position. A light transmission path 29 which extends from the light source 10 to the phototube 14 is thus established. The two filter wheels 12 and 13 are connected to drive or positioning motors 35 and 36, respectively, which may be used to position the two filter wheels. The filter wheels 12 and 13 are positioned intermediate the photomultiplier tube 14 and the sample support 11. The filter wheels 12 and 13 are positioned so that the outer peripheral portion of the wheels overlap and are in line with the photomultiplier tube 14 and the light source 10 when the light source 10 is in the transmission mode position. A number of calibrated neutral density filters 26 which cover the desired range of density measurements to be made are positioned at the outer peripheral portion of the filter wheel 13 for positioning in a singular fashion in the light path 29. The number of neutral density filters 26 is not critical. A densitometer has been constructed embodying the invention presented herein utilizing 17 precision glass neutral density filters calibrated at the National Bureau of Standards which range from an optical density of 0.01 to 8.0. The filters 26 are evenly spaced at the outer peripheral portion of the filter wheel 13.

The filter wheel 12 may be positioned between the photomultiplier tube 14 and the filter wheel 13 or between the filter wheel 13 and the sample support 11. In FIG. 1 the filter wheel 12 is shown positioned between the photomultiplier tube 14 and the filter wheel 13. A number of narrow band interference filters 27, which cover the desired range of the light spectrum for which measurements are to be made, are positioned at the outer peripheral portion of the filter wheel 12 for positioning in a singular fashion in the light transmission path 29. As in the case of the neutral density filters 26, the number of the interference filters 27 is not critical. In a densitometer constructed which embodies the invention presented herein, 36 interference filters ranging from 360 to 760 nanometers were utilized. An interference filter was provided for each 10 nanometers in the range from 400 to 700 nanometers with the 360 to 400 range and the 700 to 760 nanometer range being covered at increments of 20 nanometers. A monochromator can be used instead of the individual interference filters 27. A monochromator would provide higher color discrimination.

The light piping arrangement 15 includes a first section 31 and a second section 32. The first section 31 extends between the photomultiplier tube 14 and a point adjacent the path of a second series of interference filters 28 mounted on the filter wheel 12. The second section 32 extends between the light source 10 and a point on the other side of the filter wheel 12 which is opposite the end of the first section. The end portions of sections 31 and 32 are fixedly positioned. The manner in which this is done is not shown. Since the light source 10 is movable, it is necessary, however, that the intermediate portion of section section 32 be flexible. Sections 31 and 32 of the light piping arrangement 15 are therefore formed using known flexible fiber optic techniques.

The second series of interference filters 28 is positioned on the filter wheel 12 inwardly of the first series of interference filters 27. The filters 28 are within the range of the light spectrum covered by filters 27. The second series of interference filters 28 are used with the light piping arrangement 15 during calibration to measure the output of the photomultiplier tube 14 in response to the light of the lamp of the light source 10 for each of the filters 28. During measurement of a sample measurements are again made of the output of the photomultiplier tube 14 in response to the light at the lamp of the light source 10 for each of filters 28 which are then related to the output measurements obtained during calibration for each of the filters 28. In this manner provision is made for spectral corrections of the light source 10 and photomultiplier tube 14. In the densitometer constructed which embodies the invention presented herein, the second series of interference filters 28 included four filters to provide correction measurements at 400, 500, 600 and 700 nanometers.

When any one of the second series of interference filters 28 is presented to the light piping arrangement 15, which extends between the photomultiplier tube 14 and the light source 10, none of the interference filters 27 is then presented to the light transmission path 29.

Thus, it should be noted that the interference filters 27 are placed at regular intervals around the outer peripheral portion of the filter wheel 12 except for the blank space 30 which is presented to the light transmission path 29 when any one of the second series of interference filters 28 is individually or singularly presented to the light piping arrangement 15. With this arrangement no light is transmitted from the light source 10 to the photomultiplier tube 14 via the light transmission path 29 when the second series of interference filters 28 are positioned for passage of light via the light piping arrangement 15.

The light baffle 16 is positioned between the photomultiplier tube 14 and the filter wheel 12 while the light baffle 17 is positioned between the sample support 11 and the filter wheel 13. The light baffles 16 and 17 are used to prevent any stray light from passing to the photomultiplier tube 14.

The circuitry 18 includes a constant current closed loop 37. An amplifier 38 and a high voltage power supply 39 connected in series with the photomultiplier tube 14 form the closed loop 37. The constant current closed loop 37 provides for control of the anode current of the photomultiplier tube 14 at a constant level with variation of the dynode voltage of the photomultiplier tube 14. The use of the constant current closed loop 37 makes it possible to use the densitometer to measure density values to D=8.0. The use of a constant current closed loop to provide for a constant anode current with variation of the dynode voltage to improve the operation of a photomultiplier tube is taught in the prior art. The remainder of the circuitry 18 provides a means for measuring the output of the photomultiplier tube 14 and includes a buffer amplifier 40 connected to the output of the photomultiplier tube 14 with the output of the buffer amplifier 40 connected to a logarithmic amplifier 41. The output of the logarithmic amplifier 41 provides an output which is linear with respect to density.

A photomultiplier tube is subject to hysteresis and space charge effects, which can be minimized by reducing the voltage to the photomultiplier tube to zero before each reading is taken or by subjecting the photomultiplier tube to a light source prior to taking each reading of the photomultiplier tube output. The prior art indicates that tungsten lamps have been used as the light source for such purpose. While the tungsten type lamp provides a suitable source of light, a light emitting diode has been found to make a more desirable light source since it can be switched faster than a tungsten lamp. This is important since it saves time in the calibration of the densitometer and when the densitometer is used to examine samples. A light emitting diode 42 is shown adjacent the photomultiplier tube 14 to subject the photomultiplier tube 14 to the output of the light emitting diode 42 prior to obtaining the output of the photomultiplier tube 14. A current controlling device can be used to control the operation of the diode 42. In FIG. 1, switch 43 is used and is shown with one side connected to one input of the light emitting diode 42 with the other side of the switch connected to one side of a direct current source 44. The other input of the light emitting diode 42 is connected to the other side of the power source 44. Light from the light emitting diode 42 is directed to the photomultiplier tube 14 whenever the switch 43 is operated to the closed position.

Calibration of the densitometer described can be accomplished in a manner making it possible to use the densitometer for making absolute transmission density measurements and absolute reflection density measurements. The input - output characteristics of the densitometer is first established. This requires that the light source 10 be placed in the first or transmission mode position. One of the series of interference filters 27 is positioned in the light transmission path 29. It has been found convenient to select a filter near the middle of the range of the light spectrum covered by the filters 27. In the case of a densitometer constructed in accordance with the invention presented herein, a 550 nanometer filter is used for this portion of the calibration procedure. Each of the neutral density filters 26 are then individually or singularly positioned in the light transmission path 29. Since each of the neutral density filters 26 has been calibrated, the optical density for each filter is known. The output of the logarithmic amplifier 41 which is a measure of the output of the photomultiplier tube 14 is then recorded for each of the filters 26. Prior to each reading, the photomultiplier tube 14 is momentarily subjected to light from the light emitting diode 42.

Figure 2:
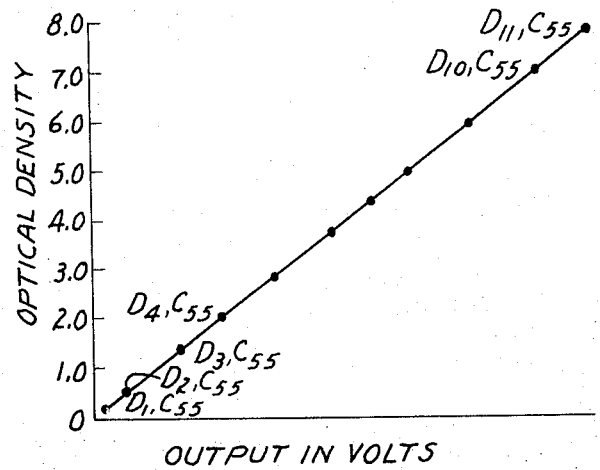
FIG. 2 is a graph of optical density versus output characteristics of the densitometer.

With the output of the logarithmic amplifier 41 obtained for each of the neutral density filters 26 as they are presented and with the density of each of the neutral density filters 26 known, the response of the densitometer in terms of density versus output is established. FIG. 2 shows a plot of the data that would be obtained if eleven density filters 26 are used. Each point on the curve can be identified by the density filter used and the interference filter used. Thus, $D_2 C_{55}$, indicates the data or point for density filter 2 used with the 550 nanometer interference filter. For purposes of illustration the filter designated by the notation $D_2$ will be considered to be an interference filter 27 having a 0.5 optical density.

It is then necessary that a point be determined on the curve shown in FIG. 2 for each of the interference filters 27. In order to be certain that the reading for each of the interference filters 27 will fall within the curve of FIG. 2 that has been established, it is necessary that one of the neutral density filters 26 other than the neutral density filter $D_1$ which established the beginning of the curve shown in FIG. 2 be used in conjunction with the interference filters 27 as they are presented in the optical of light path 29. In the case of a densitometer constructed in accordance with the invention presented herein where 17 neutral density filters were used which ranged from 0.01 to 8.0 optical density, the 0.5 optical density filter was used when the interference filters 27 were presented and the output of the logarithmic amplifier 41 recorded. The output for each of the interference filters 27 will then lie on the curve in the vicinity of the output for the 0.5 optical density filter when used with the 550 nanometer interference filter since the variation from this point for the other interference filters 27 will be limited to about ±.5 optical density.

Figure 3:
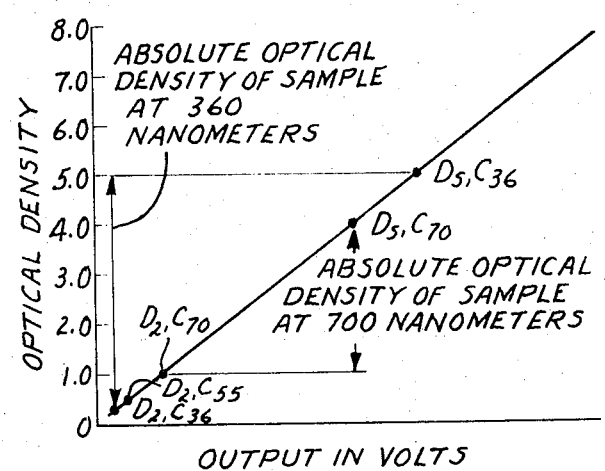
FIG. 3 is the graph of FIG. 2 with a showing of how absolute density measurements are obtained.

FIG. 3 hows the curve of FIG. 2 with the output of the logarithmic amplifier 41 obtained when each of the interference filters 27 is presented with the $D_2$ or 0.5 neutral density filter. Though the same 0.5 density filter is used in conjunction with each of the interference filters 27, the output obtained at the logarithmic amplifier 41 varies slightly due to the physical structure of the interference filters 27. As mentioned, this variation is limited to about ±.5 optical density. For purposes of illustration only points for the neutral density filter $D_2$ used with filters 27 for 360, 550 and 700 nanometers are shown in FIG. 3. The designation for each such points on the curve shown in FIG. 3 is given in terms of the neutral density filter ($D_2$) used and the particular interference filter used. Thus, for example, the designation $D_2$, $C_{36}$ indicates that the point was established using the 0.5 neutral density filter with the 360 nanometer interference filter.

At some point during or immediately following the calibration procedure that has been described, readings are taken of the output of the logrithmic amplifier 41 when each of the interference filters 28 are presented to the light piping arrangement 15 to provide a calibration reference for the light source 10 and the photomultiplier tube 14. As has been explained, when each of the interference filters 28 is singularly presented in the light piping arrangement 15, none of the interference filters 27 is positioned in the light path 29 since the blank space 30 at the outer peripheral portion of the filter wheel 12 is then positioned in the light path 29.

Following the calibration procedure described, the absolute transmission optical density of a sample or specimen can be measured. The sample or specimen is placed over the aperture 19 on the sample support 11. The neutral density filter used during the calibration in conjunction with each of the interference filters 27 is positioned in the light transmission path 29. The filter wheel 12 is then rotated to singularly position each of the interference filters 27 to the light path 29 and a reading of the logarithmic amplifier 41 is taken for each of the interference filters 27. Using the outputs obtained, the point on the curve shown in FIG. 3 for each of these outputs can then be established. Only two such points are shown on FIG. 3. The notation $D_s$, $C_{36}$, for example, designates the point on the curve corresponding to the output obtained with the sample or specimen in position and the 360 nanometer filter positioned in the light path 29. The absolute transmission optical density of the sample at a wave length of 360 nanometers can then be found from the points on plot shown in FIG. 3 and is equal to the optical density difference presented between the point on the curve $D_2$, $C_{36}$ and point $D_s$, $C_{36}$. Similarly, the absolute transmission optical density of the sample at a wave length of 700 nanometers is the difference in density between the point on the curve in FIG. 3 designated by $D_s$, $C_{70}$ and the point designated by $D_2$, $C_{70}$. In this manner, the absolute transmission optical density of the sample at the wave length of each of the interference filters 27 can be established and a plot of optical density versus wave length made.

At some point, each immediately before, during or immediately following the presentment of the interference filters 27 in the light path 29 with the sample or specimen in position, the output of the logarithmic amplifier 41 for each of the interference filters 28 should be measured. Using the structure of the densitometer as described, this step can be most conveniently done immediately after or immediately before each of the interference filters 27 have been presented. Any difference in the output of the logarithmic amplifier 41 that is obtained for each of the interference filters 28 in reference to the output obtained when the interference filters 28 were presented during calibration must be applied as a correction to the optical density values found for plotting optical density versus wave length for a sample or specimen.

In the event the absolute reflection optical density of a sample is to be measured, the light source 10 is rotated to its second position to direct light toward the sample or specimen for reflection therefrom to the photomultiplier tube 14. Since the same light source is used and the distance between the light source and the sample is the same as that used during the calibration of the densitometer, the calibration of the densitometer determined with light source 10 in the transmission mode remains valid for the densitometer when used in the reflection mode. Only one fixed correction need be applied to the calibration data. The correction is needed since the light is scattered when the reflective mode is used. Knowing the angle at which the light source 10 is presented to the specimen support, it is possible for one skilled in the art to calculate the fixed correction factor which will be applied to the data presented in FIG. 3 which were established by the calibration made with the light source 10 in the transmission mode.

Since the section 32 of the light piping means 15 will be flexed when the light source 10 is moved to the second or reflective transmission mode, it is necessary that the output of the logarithmic amplifier 41 for each of the interference filters 28 be obtained immediately after the calibration with the light source 10 in the transmission mode has been completed and light source 10 has been moved to the reflective transmission mode position. Then, with a sample presented at the support 11 and with the neutral density filter used in the calibration when each of the interference filters 27 were presented, the output of the logarithmic amplifier 41 can be measured for each of the interference filters 27 as they are singularly or individually presented to the light path 29 with the sample or specimen in position.

At some point during or immediately following the recording of the output of the logarithmic amplifier 41 for each of the filters 27, the filter wheel 12 should be positioned to obtain readings of the output of the logarithmic amplifier 41 when each of the filters 28 are singularly positioned in the light transmission path of the light piping arrangement 15 to determine whether there have been spectral changes in the lamp of light source 10 or the phototube 14 for which a correction must be made. Here, again, it is convenient to record the output of the amplifier 47 for each of the filters 28 after all of the interference filters 27 have been presented with the sample or specimen in position and a measure of the output of the amplifier 41 obtained.

The densitometer can also be used to make relative reflective optical density measurements. When it is desired that this be done, the densitometer is calibrated as previously described but with the light source 10 in the second or reflective mode position and with a calibration reference such as magnesium oxide, barium sulfate or the like in position on the sample or specimen support 11. The optical density obtained for a sample or specimen when the densitometer is calibrated in this manner will be a relative optical density measurement since a reference material was used for calibration.

Since the invention presented herein is subject to a variety of modifications and changes in detail as may be apparent to one skilled in the art, it is intended that all matter contained in the above description and shown on the accompanying drawing, shall be interpreted as illustrative and not in a limiting sense.

What is claimed is:

1. A densitometer for use in making transmission and reflection density measurements of a specimen under investigation including:

a specimen support having an aperture;

a phototube positioned in line with and away from said aperture on the specimen receiving side of said support; and a light source movable at a fixed radius about a point located centrally of said aperture, said light source movable to a first position in line with said phototube and said aperture on the side of said support opposite from said phototube, said first position used to make transmission measurements, and movable to a second position on said phototube side of said support for directing light toward a specimen placed on said support at said aperture, said second position used to make reflection density measurements.

2. A densitometer in accordance with claim 1 including means for obtaining an output from said phototube in response to light from said light source at a number of wavelengths for use in correcting for any change in the light source and the response of said phototube, said means including light piping means having a first and second section, one end of said first section positioned at said light source, one end of said second section positioned at said phototube, the other end of said first section positioned opposite the other end of said second section and spaced therefrom; and a series of interference filters singularly movable to a position intermediate said other ends of said first and second sections of said light piping means.

3. A densitometer in accordance with claim 2 wherein said first section is flexible for movement with said light source.

4. The densitometer in accordance with claim 1 and further including a series of interference filters singularly positionable between and in line with said aperture and said phototube; and a series of neutral density filters singularly positionable between and in line with said aperture and said phototube.

5. A densitometer in accordance with claim 1 and further including a first rotatable filter wheel positioned between said phototube and said aperture with the outer peripheral portion of said wheel in line with said aperture and said phototube; a series of interference filters mounted on said first wheel at the outer peripheral portion of said first filter wheel; a second rotatable filter wheel positioned between said phototube and said aperture with the outer peripheral portion of said second filter wheel in line with said aperture and said phototube; and a series of neutral density filters mounted on said second filter wheel at the outer peripheral portion of said second filter wheel.

6. A densitometer for use in making transmission and reflection density measurements of a specimen under investigation including:
  a specimen support having an aperture;
  a phototube positioned in line with and away from said aperture on the specimen receiving side of said support;
  a light source movable at a fixed radius about a point located centrally of said aperture, said light source movable to a first position in line with said phototube and said aperture on the side of said support opposite from said phototube, said first position used to make transmission measurements, and movable to a second position on said phototube side of said support for directing light toward a specimen placed on said support at said aperture, said second position used to make reflection density measurements;
  a first rotatable filter wheel positioned between said phototube and said aperture with the outer peripheral portion of said first filter wheel in line with said aperture and said phototube;
  a first series of interference filters singularly mounted and spaced along the outer peripheral portion of said first wheel;
  a second series of interference filters singularly mounted and spaced on said first wheel inwardly of said first series of interference filters;
  a second rotatable filter wheel positioned between said phototube and said aperture with the outer peripheral portion of said second wheel in line with said aperture and said phototube;
  a series of neutral density filters singularly mounted and spaced along the outer peripheral portion of said second wheel; and
  a light piping means having a first and second section, one end of said first section positioned at said light source, one end of said second section positioned at said phototube, the other end of said first section positioned opposite the other end of said second section and spaced therefrom said other ends of said first and second sections positioned with respect to said first filter wheel permitting said second series of interference filters to be singularly presented to said other ends of said first and second sections upon rotation of said first filter wheel.

7. A method for calibrating a single beam spectral densitometer having a light source and phototube comprising the steps of
  a. maintaining the current through said phototube constant,
  b. positioning the light source for direct light transmission to said phototube,
  c. presenting a narrow band interference filter between said light source and said phototube,
  d. singularly presenting each of a series of calibrated neutral density filters between said light source and said phototube while said interference filter is presented and recording the output of a logarithmic amplifier coupled to the output of said phototube for each of said series of neutral density filters to obtain the optical density versus output characteristics of the densitometer;
  e. presenting a selected one of said series of neutral density filters between said light source and said phototube, and
  f. singularly presenting each of a series of narrow band interference filters between said light source and said phototube while said selected one of said neutral density filters is presented and recording the output of said logarithmic amplifier to establish a reference point for each of said series of narrow band interference filters in relation to said optical density versus output characteristics of the densitometer.

8. A method as set forth in claim 7 which further includes the step of singularly presenting each of a second series of narrow band interference filters between said light source and said phototube via a fiber optic path and recording the output of a logarithmic amplifier coupled to the output of said phototube.

9. A method as set forth in claim 7 wherein said selected one of said series of neutral density filters has a density which lies within the density range covered by said series of neutral density filters.

10. A method as set forth in claim 7 wherein said selected one of said series of neutral density filters has a density which lies within and near one end of the density range covered by said series of neutral density filters.

11. A method for determining the absolute optical density versus wavelength characteristics of a material using a single beam spectral densitometer having a support for the material, a light source and phototube comprising the steps of
  a. calibrating the densitometer by the method comprising the steps of
    1. maintaining the current through said phototube constant,
    2. positioning the light source for direct light transmission to said phototube,
    3. presenting a narrow band interference filter between said light source and said phototube,
    4. singularly presenting each of a series of calibrated neutral density filters between said light source and said phototube while said interference filter is presented and recording the output of a logarithmic amplifier coupled to the output of said phototube for each of said series of neutral density filters to obtain the optical density versus output characteristics of the densitometer, 5. presenting a selected one of said series of neutral density filters between said light source and said phototube, 6. singularly presenting each of a series of narrow band interference filters between said light source and said phototube while said selected one of said neutral density filters is presented and recording the output of said logarithmic amplifier to establish an optical density reference point for each of said series of narrow band interference filters in relation to said optical density versus output characteristics of the densitometer;

b. positioning the material to be examined on said support;

c. positioning said light source for reflective transmission in the event absolute reflectance optical density is to be determined;

d. singularly presenting each of said series of interference filters between the light passing from said material to said phototube and recording the output of a logarithmic amplifier coupled to the output of said phototube for each of said series of interference filters presented to establish the optical density of the material for each of said series of interference filters in relation to said optical density versus output characteristics of the densitometer and e. determining the absolute density of the material for each of said interference filters by establishing the difference between the optical density reference for each of said interference filters established by step (6) and the corresponding optical density established by step d.

12. A method as set forth in claim 11 wherein said light source when positioned for reflective transmission in the event absolute reflectance optical density is to be determined is positioned the same distance from said material as said light source is from said material when said light source is in position for direct light transmission to said phototube.

13. A method as set forth in claim 11 wherein a further step is included when there is positioning of said light source for reflective transmission, said further step including singularly presenting each of a second series of narrow band filters between said light source and said phototube via a fiber optic path after said light source has been positioned for reflective transmission and recording the output of said logarithmic amplifier coupled to the output of said phototube.

14. A method as set forth in claim 13 wherein said further step is performed immediately following said positioning of said light source for reflective transmission and again after step d.

* * * * *